(12) United States Patent
Yaoi et al.

(10) Patent No.: US 8,500,101 B2
(45) Date of Patent: Aug. 6, 2013

(54) ENGAGEMENT CHAIN

(75) Inventors: Kiyotake Yaoi, Osaka (JP); Michio Oitake, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 309 days.

(21) Appl. No.: 12/913,083

(22) Filed: Oct. 27, 2010

(65) Prior Publication Data
US 2011/0101294 A1 May 5, 2011

(30) Foreign Application Priority Data
Nov. 5, 2009 (JP) .................................. 2009-254156

(51) Int. Cl.
*B66D 1/30* (2006.01)

(52) U.S. Cl.
USPC .......................................... 254/372; 254/358

(58) Field of Classification Search
USPC ................................. 254/372, 358
See application file for complete search history.

(56) References Cited

U.S. PATENT DOCUMENTS

| | | | |
|---|---|---|---|
| 3,645,146 A | 2/1972 | Nagin | |
| 5,156,574 A | 10/1992 | Gai | |
| 5,425,679 A * | 6/1995 | Utz | ................................ 474/91 |
| 6,615,974 B2 * | 9/2003 | Scholz | .......................... 198/712 |
| 8,272,504 B2 * | 9/2012 | Neugebauer et al. | ..... 198/867.15 |
| 2002/0130016 A1 * | 9/2002 | Scholz | .......................... 198/712 |
| 2009/0118048 A1 | 5/2009 | Takashima et al. | |

FOREIGN PATENT DOCUMENTS

| | | |
|---|---|---|
| EP | 0624703 A1 | 11/1994 |
| FR | 2659714 A3 | 5/2001 |
| GB | 1395199 A | 5/1975 |
| JP | S55-028908 Y | 7/1980 |
| JP | S61-007646 U | 1/1986 |
| JP | 11-278797 | 10/1999 |
| JP | 337928 B | 12/1999 |

OTHER PUBLICATIONS

JP2009-254156, Oct. 21, 2010, Office Action.
European office action as mailed Aug. 3, 2011 in related application # 10189365.9.

* cited by examiner

*Primary Examiner* — Emmanuel M Marcelo
(74) *Attorney, Agent, or Firm* — Maschoff Brennan

(57) ABSTRACT

The invention provides a pair of engagement chains which has inner tooth plates, bushes, outer tooth plates and connecting pins and is integrated by engaging hook portions of the inner tooth plates and hook portions of the outer tooth plates and is branched by disengaging the hook portions of the inner tooth plates and the hook portions of the outer tooth plates. The pair of engagement chains further includes inflection restricted plates having inflection restricted surfaces and inflection restricting plates having inflection restricting portions that are connected on the both ends of the connecting pins.

5 Claims, 5 Drawing Sheets

ENGAGEMENT CHAIN

CROSS REFERENCE TO RELATED APPLICATIONS

This application claims the foreign priority benefit under Title 35, United States Code, §119 (a)-(d) of Japanese Patent Application No. 2009-254156, filed on Nov. 5, 2009 in the Japan Patent Office, the disclosure of which is herein incorporated by reference in its entirety.

BACKGROUND OF THE INVENTION

1. Field of the Invention

The present invention relates to an engagement chain incorporated into a driving system for use in a manufacturing facility in various manufacturing fields, a transfer facility in transportation fields, a nursing care facility in health-care and welfare fields, a stage facility in performing art fields and the like to vertically lift works with respect to an installation surface. More particularly, the present invention relates to an engagement chain for a driving system with improved buckling strength.

2. Related Art

One example of a driving system currently known in the art is a lift system for lifting heavy loads using a pair of transmission chains, i.e., so-called engagement chains, that move up and down by engaging with each other. One example of such a lift system is disclosed in the claims and FIG. 1 of Japanese Patent Publication No. 3370928.

One problem with such prior art engagement chains, however, is a pair of engagement chains engaging with each other inevitably causes backlash therein due to gaps between engaging portions and between bushes and connecting pins when the engaging portions of link plates are engaged, meaning it is difficult to assure rigidity of the pair of engagement chains engaging with each other and the buckling strength of the pair of engagement chains may possibly drop.

BRIEF SUMMARY OF THE INVENTION

Accordingly, the present invention aims at solving the aforementioned prior art problems by providing a pair of engagement chains whose buckling strength is improved, which realizes stable forward and backward driving for performing work without requiring an auxiliary guide means for suppressing buckling and inclination of the engagement chains and which eliminates backlash caused within the pair of engagement chains engaging with each other.

A first aspect of the invention is A pair of engagement chains, each comprising a plurality of inner link units each including a bush press-fitted into a pair of bush press-fitting holes formed in the chain longitudinal direction of a pair of inner tooth plates having hook portions and being disposed apart from each other in a chain width direction, at least two outer tooth plates, each having hook portions and a pair of pin holes formed in the chain longitudinal direction, and each being disposed respectively on the outer sides of the inner link unit in the chain width direction while being shifted by a half pitch in the chain longitudinal direction with respect to the inner tooth plates, at least two inflection restricted plates, each having an inflection restricted surface on the hook engaging side of the inner tooth plates and the outer tooth plates, and at least two inflection restricting plates, each having an inflection restricting portion that projects toward the inflection restricted surface of the inflection restricted plates so as to abut with two adjacent inflection restricted surfaces of two adjacent inflection restricted plates in the chain longitudinal direction, and connecting pins fitted into the bushes and the pair of pin holes to link the inner link units, outer tooth plates, the inflection restricted plates, and the inflection restricting plates in the chain longitudinal direction. The pair of engagement chains are integrated by the hook portions of the inner tooth plates and the hook portions of the outer tooth plates being brought into contact so as to respectively engage with each other by a pair of driving sprockets that engage with the bushes. The pair of engagement chains are branched when the hook portions of the inner tooth plates and the hook portions of the outer tooth plates are disengaged respectively by being deflected by said pair of driving sprockets.

The pair of the engagement chains of the first aspect of the invention has such advantageous effects that because the inflection restricted plates having the inflection restricted surfaces on the hook engaging side of the inner tooth plates and the outer tooth plates and the inflection restricting plates having the inflection restricting portions that project toward the inflection restricted surfaces of the inflection restricted plates are connected respectively on the both ends of the connecting pin, the inflection restricting portions abut the inflection restricted surfaces contiguous in the chain longitudinal direction while straddling those surfaces and restrict one engagement chain from inflecting toward the hook engaging side. Accordingly, it becomes possible to suppress the pair of engagement chains from inflecting in the direction of height of the plates, to steadily keep an attitude of engagement of the chains straightly and to improve buckling strength of the pair of engagement chains.

It is then possible to steadily keep the straight chain engagement attitude of the pair of engagement chains engaging with each other and to realize the stable forward and backward motions for the work even if the pair of engagement chains is used in a suspension-type driving system in which the system is installed on a ceiling surface as its installation surface or in a cantilever supporting type system in which the system is installed on a vertical wall surface as its installation surface.

Still more, because the buckling strength of the pair of engagement chains is improved, it becomes possible to realize stable forward and backward driving of the work when it is used in the driving system described above while simplifying the system structure without requiring to install an auxiliary guide means for suppressing buckling and inclination of the engagement chains, to stably move the engagement chains forward and backward to a place distant further from the driving sprockets, to improve durability of the chain by avoiding an overload from partially acting on the engagement chains due to inclination of the engagement chains and to downsize and to lighten the chains.

Then, because the pair of engagement chains pulls from each other toward the non-hook engaging side, it becomes possible to eliminate backlash otherwise inevitably generated within the pair of engagement chains engaging with each other due to gaps generated between the hook portions and between the bushes and the connecting pins when the hook portions of the inner tooth plate and the outer tooth plate are engaged and to improve the buckling strength of the pair of engagement chains further.

It is also possible to prevent driving noise from being generated during operation of the chains by eliminating the backlash that is otherwise inevitably generated in the pair of engagement chains engaging with each other and to improve work positioning accuracy by keeping the whole length of the chain constant.

The pair of engagement chains is also able to avoid the inflection restricting portion of the inflection restricting plate projecting toward the inflection restricted plate from interfering other chain composing members and to assure a degree of freedom of design of the engagement chains.

BEST MODE FOR CARRYING OUT THE INVENTION

First Embodiment

Figure 2:
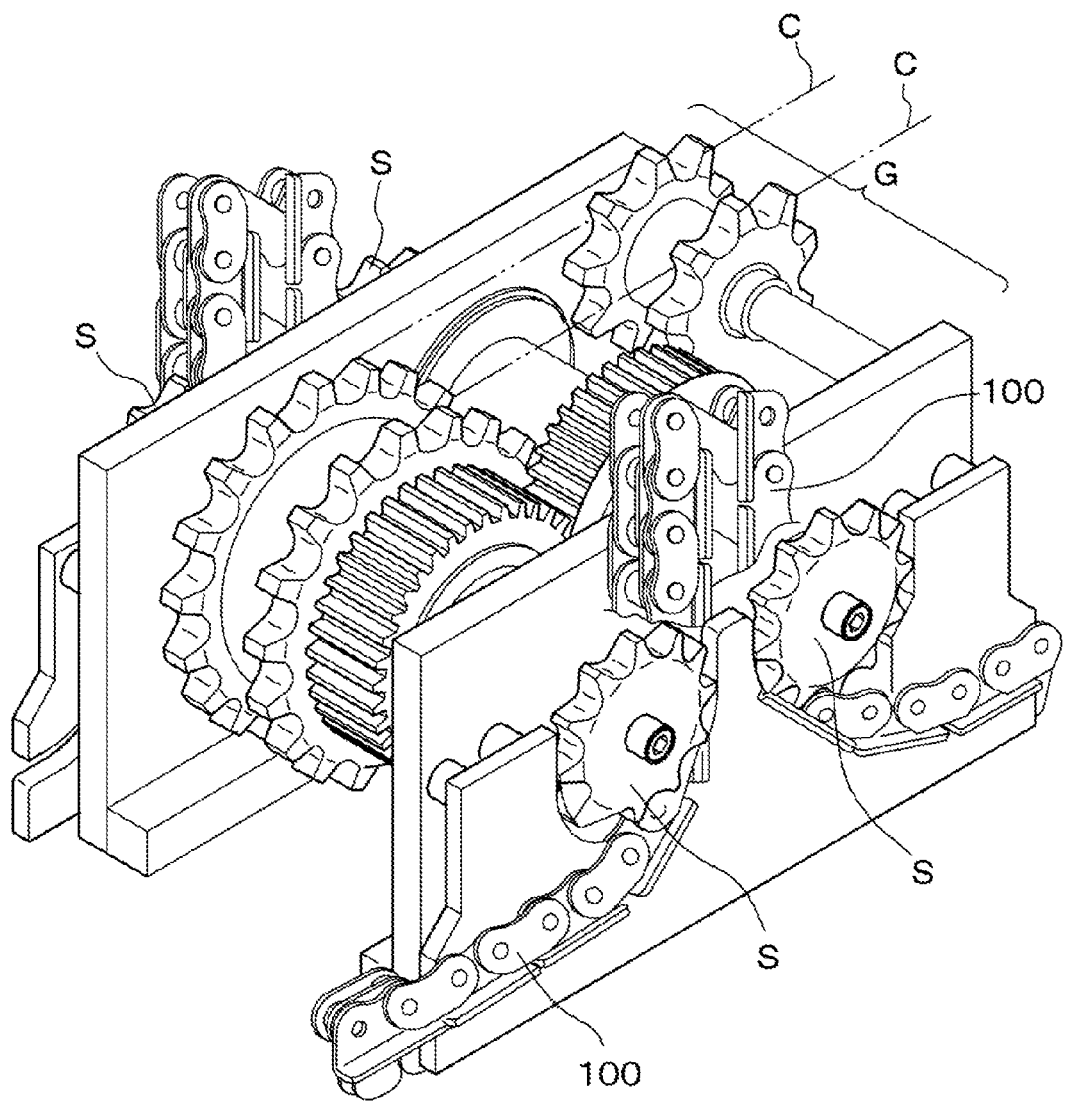
FIG. 2 is a partially enlarged view of driving sprockets and their neighborhood shown in FIG. 1.
Figure 3:
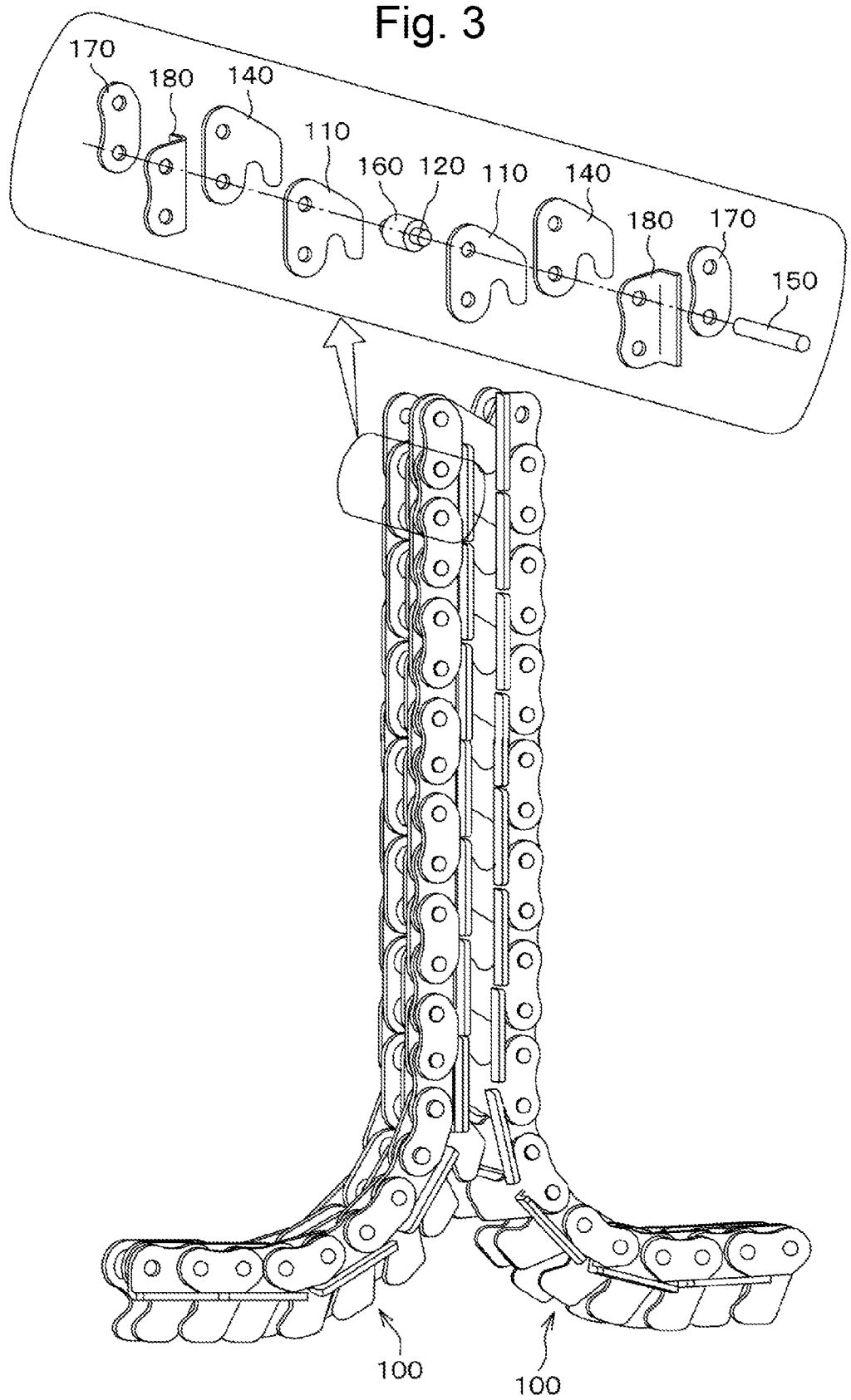
FIG. 3 is a perspective view showing the engagement chains of the invention.
Figure 4:
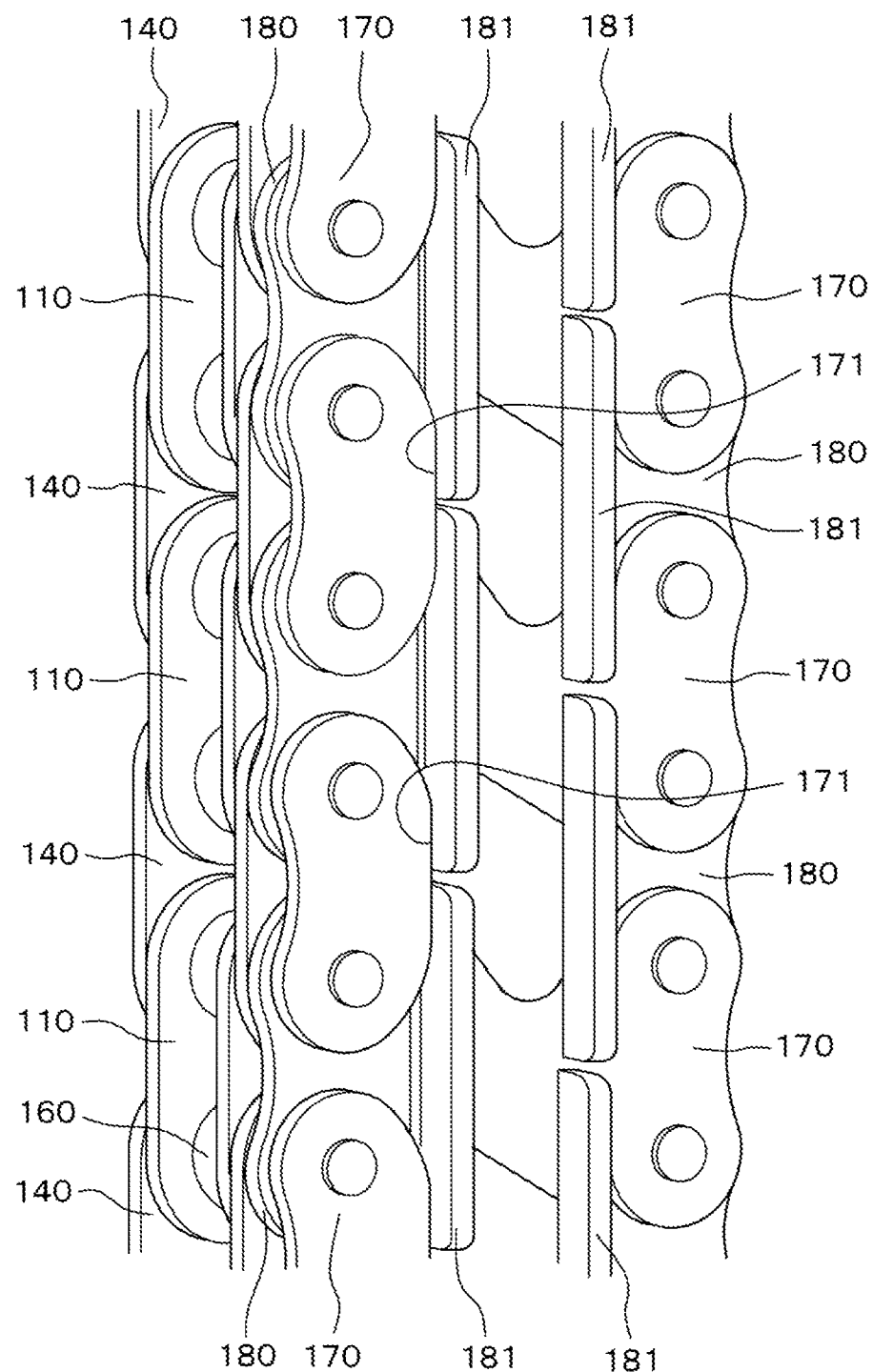
FIG. 4 is a partially enlarged view of the engagement chains of the invention.
Figure 5:
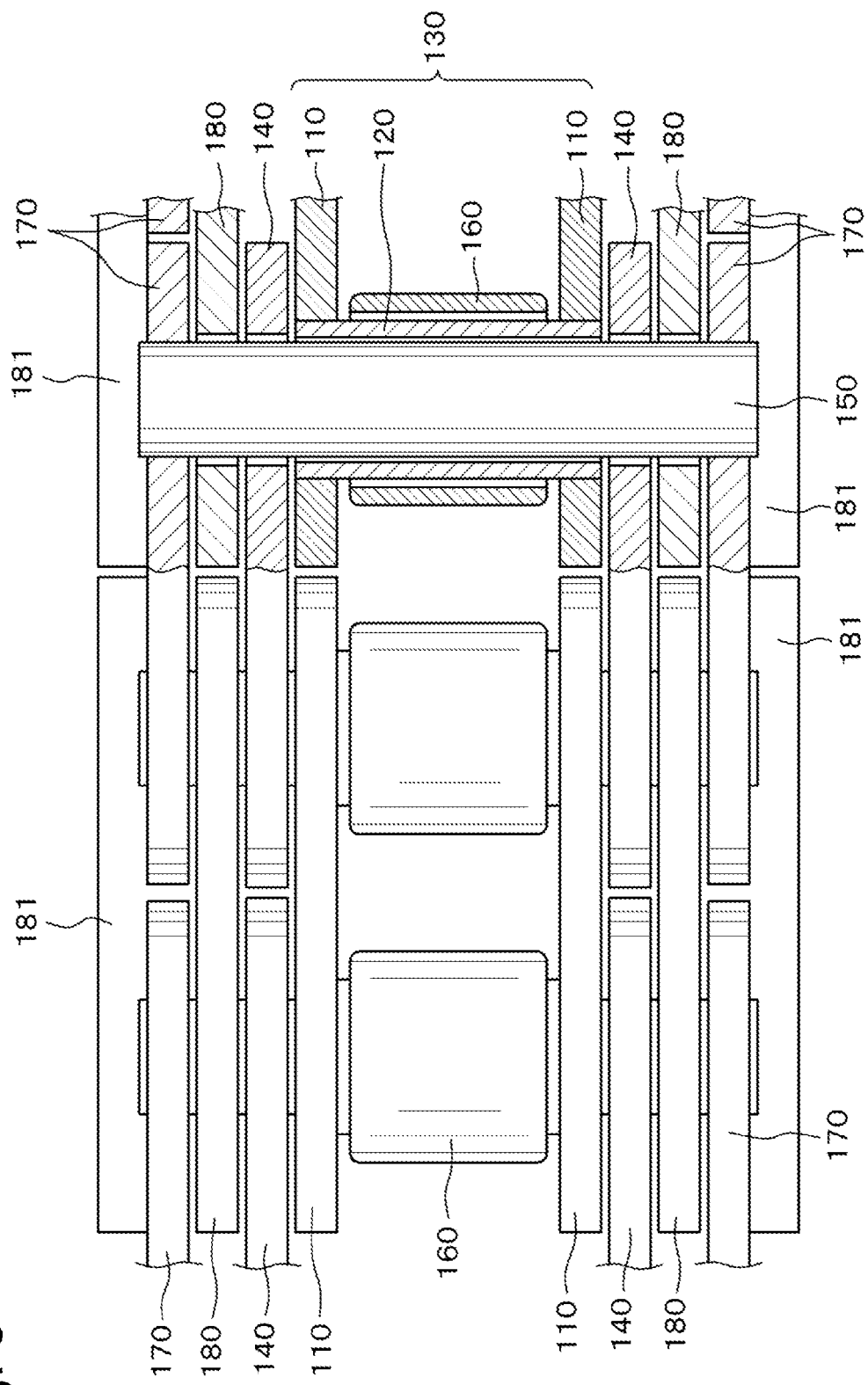
FIG. 5 is a partial section view of the engagement chain of the invention.

The engagement chain 100 of one embodiment of the invention will be explained with reference to the drawings. Here, FIG. 1 shows a mode of use of the engagement chain of a first embodiment of the invention, FIG. 2 is a partially enlarged view of the driving sprockets and their neighborhood shown in FIG. 1, FIG. 3 is a perspective view showing the engagement chains, FIG. 4 is a partially enlarged view showing the engagement chains and FIG. 5 is a partial section view showing the engagement chain.

Figure 1:
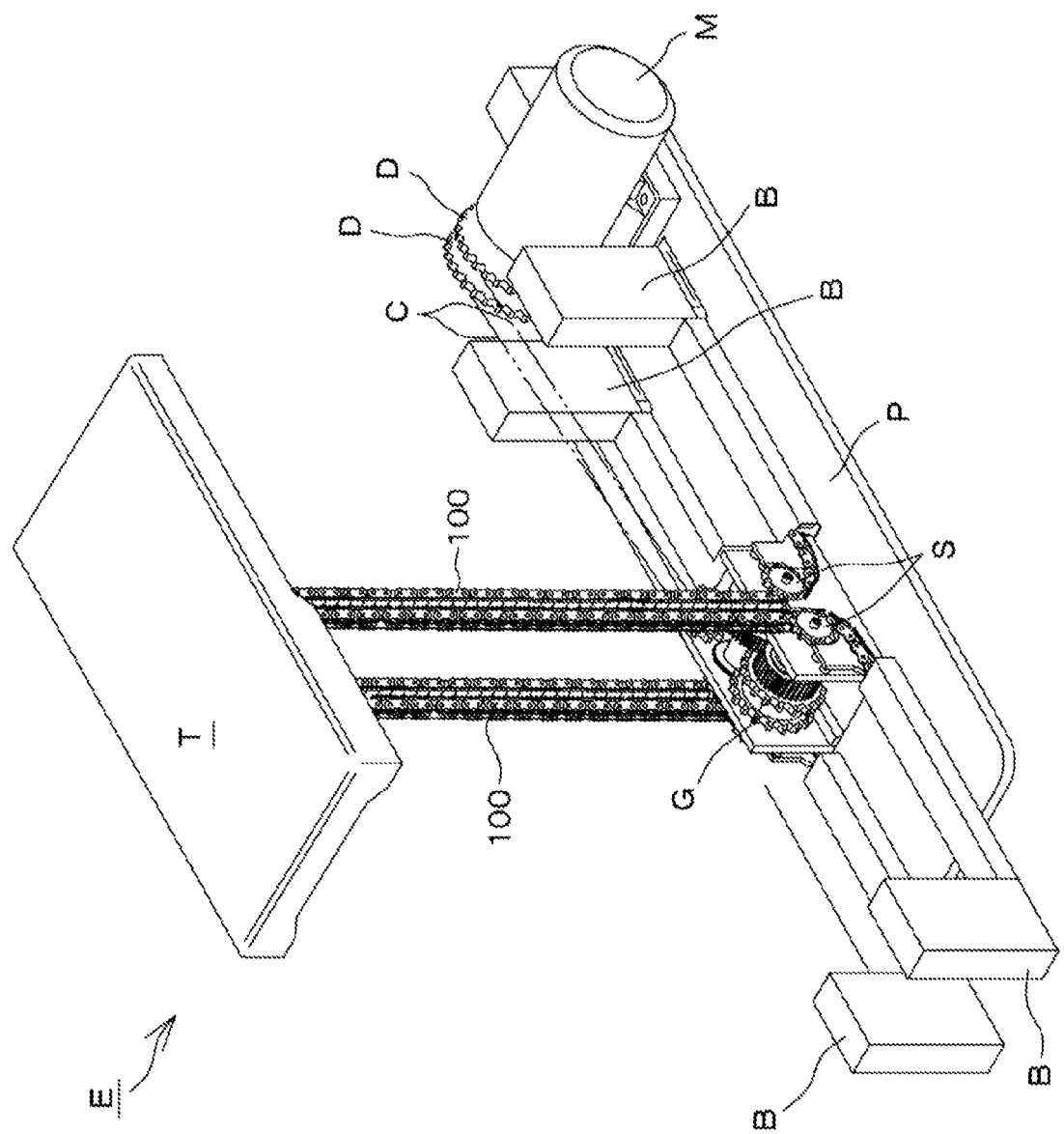
FIG. 1 shows a mode of use of an engagement chain of a first embodiment of the invention.

As shown in FIG. 1, the pairs of engagement chains 100 of the first embodiment of the invention are used by being incorporated into an engagement chain type driving system E installed so as to be stationary on a working floor surface. The system is installed in order to lift up and down a lift table T carrying a heavy load in parallel with the installation surface.

The engagement chain type driving system E described above has, as its basic system structure, a base plate P installed on the installation surface on which the lift table T described above is lifted in parallel, a pair of driving sprockets S that rotate positively and reversely in opposite directions from each other while facing to each other within one plane centering on a pair of axes of rotation juxtaposed in parallel with the base plate P, the pair of engagement chains 100 that lifts up and down the lift table T by engagement and disengaging from the pair of driving sprockets S, the lift table T described above that is secured to the upper end of the pair of engagement chains 100 and lifts in a body therewith, and a driving motor M that drives the pair of driving sprockets S.

It is noted that the system shown in FIG. 1 further includes a pair of drive-side sprockets D coaxially disposed on the output shaft side of the driving motor M, a pair of power transmission chains C composed of roller chains for transmitting power from the drive-side sprockets D to the pair of driving sprockets S, a synchronizing gear group G for changing speed of the rotation of one direction from the pair of power transmission chains C and for transmitting power to the pair of driving sprockets S so that they rotate positively and reversely in the opposite direction from each other the pair of power transmission chains C and a winding type chain storing box B for storing each one of the pair of engagement chains 100 disengaged and branched from each other.

As shown in FIGS. 2 through 5, each of the engagement chains 100 of the present embodiment used in pairs in the engagement chain type driving system E has inner link units 130 in each of which a bush 120 is press-fitted into a pair of bush press-fitting holes formed in the chain longitudinal direction of a pair of inner tooth plates 110 which disposed apart from each other in parallel. The inner tooth plates 110 have hook portions, as shown in FIG. 3.

A pair of outer tooth plates 140 are disposed respectively on the outer sides of the inner tooth plates 110 while being shifted by a half pitch in the chain longitudinal direction with respect to the inner tooth plates 110. The outer tooth plates 140 also have hook portions. Continuing in the chain width direction, a pair of inflection restricting plates 180 disposed respectively on the outer sides of the outer tooth plates 140 while being shifted by a half pitch in the chain longitudinal direction with respect to the outer tooth plates 140. Then, a pair of inflection restricted plates 170 disposed respectively on the outer sides of the inflection restricting plates 180 while being shifted by a half pitch in the chain longitudinal direction with respect to the inflection restricting plates 180 are then arranged in the chain width direction. Connecting pins 150 loosely fitted respectively into the bushes 120, pin holes of the outer tooth plates 140 and pin holes of the inflection restricting plates 180 and press-fitted into pin holes of the inflection restricted plates 170 and rollers 160 are fitted respectively around the bushes 120. It is noted that the connecting pin 150 may also be press-fitted into the pin holes of the outer tooth plates 140.

As shown in FIGS. 1 and 2, the pair of engagement chains 100 is also arranged so as to elevate autonomously when the inner tooth plates 110 and the outer tooth plates 140 of two chains 100 respectively facing each other are engaged and integrated by being deflected from the state in which the chains are oppositely disposed respectively around the pair of driving sprockets S from the horizontal direction to the vertical direction. The pair of engagement chains 100 are also arranged so as to be branched when the inner tooth plates 110 and the outer tooth plates 150 are disengaged, respectively, by being deflected from the vertical direction to the horizontal direction by the pair of driving sprockets S described above.

Next, the specific configuration of the inflection restricted plate 170 and the inflection restricting plate 180 of the pair of engagement chains 100 of the present embodiment will be explained in detail with reference to FIGS. 2 through 5.

As shown in FIGS. 2 through 5, the inflection restricted plate 170 has an inflection restricted surface 171 on the hook engaging side where the hook portion is formed in the inner or outer tooth plate 110 or 140. The inflection restricting plate 180 has an inflection restricting portion 181 that projects toward the inflection restricted plate 170 to restrict the chain from inflecting toward the hook engaging side by coming into abutting contact with two adjacent inflection restricted surfaces 171 contiguous in the chain longitudinal direction while the engagement chain 100 is stretched straightly.

The inflection restricted surface 171 formed on the inflection restricted plate 170 and the inflection restricting portion 181 formed in the inflection restricting plate 180 are formed so that they abut each other when the inner tooth plates 110 and the outer tooth plates 140 of two chains 100 are engaged with each other by the driving sprockets S. The inflection restricted surface 171 and the inflection restricted plate 170 are designed so that one engagement chain 100 warps toward the non-hook engaging side as a whole when the engagement chain 100 is stretched moderately.

In the engagement chains 100 of the embodiment, the inflection restricted plate 170 having the inflection restricted surface 171 is arranged on the hook engaging side of the inner or outer tooth plate 110 or 140 and is held in place by the connecting pin 150. Similarly, the inflection restricting plate 180 is arranged so that the inflection restricting portion 181 projects toward the inflection restricted plate 170 and is also connected with the connecting pin 150 while adjoining the inflection restricted plate 170 in the chain width direction.

Accordingly, when the pair of engagement chains 100 are stretched straightly, the inflection restricting portion 181 abuts two adjacent inflection restricted surfaces 171 in the chain longitudinal direction while straddling the surfaces. The inflection restricting portion 181 restricts each one engagement chain 100 from inflecting toward the hook engaging side, so that it becomes possible to suppress the pair of engagement chains 100 engaged with each other from inflecting in the direction of height of the plates, to reliably keep the straight chain engagement attitude, and to improve buckling strength of the pair of engagement chains 100.

The inflection restricted surface 171 of the inflection restricted plate 170 and the inflection restricting portion 181 of the inflection restricting plate 180 are formed so that they abut each other when the inner tooth plates 110 and the outer tooth plates 140 are engaged respectively by the driving sprockets S as described above.

Accordingly, when the engagement chains 100 engage with each other and the chain engagement attitude of each engagement chain 100 becomes straight, the inflection restricted surface 171 and the inflection restricting portion 181 abut each other and a force of inflecting the inflection restricted plate 170 and the inflection restricting plate 180 to the non-hook engaging side is generated. Then, because the engagement chains 100 pull from each other toward the non-hook engaging side, it becomes possible to eliminate backlash which is otherwise inevitably generated within the pair of engagement chains 100 engage with each other due to gaps generated between the hook portions and between the bush 120 and the connecting pin 150 when the hook portions of the inner and outer tooth plates 110 and 140 are engaged. Thus, it is possible to further improve the buckling strength of the pair of engagement chains 100.

It is also possible to steadily keep the straight chain engagement attitude of the pair of engagement chains 100 engaging with each other and to realize stable forward and backward movements for the work even if the engagement chains are used in a suspension type driving system in which the system is installed on a ceiling surface as its installation surface or in a cantilever supporting type driving system in which the system is installed on a vertical wall surface as its installation surface.

The use of the driving system as described above allows the stable forward and backward driving for the work to be realized while simplifying the system structure without requiring a separate auxiliary guide means that suppresses buckling and inclination of the pair of engagement chains 100 by improving the buckling strength of the pair of engagement chains 100. It is also possible to move the pair of engagement chains 100 forward and backward stably to position further from the driving sprockets S, to improve the durability of the chain by avoiding a partial overload from acting on the pair of engagement chains 100 otherwise caused by inclination of the chains and to downsize and to lighten the chain.

It is also possible to prevent driving noise from being generated during operation of the chains by eliminating the backlash that is otherwise inevitably generated in the pair of engagement chains 100 engaged with each other and to improve work positioning accuracy by keeping the whole length of the chain constant.

The inflection restricted plate 170 is disposed at the outermost end portion of the connecting pin 150 in parallel with the outer tooth plate 140 and the inflection restricting plate 180 is disposed between the outer tooth plate 140 and the inflection restricted plate 170 in parallel with the inner tooth plate 110. Accordingly, the inflection restricting portion 181 of the inflection restricting plate 180 projecting toward the inflection restricted plate 170 may be avoided from abutting with other chain composing members, so that a design flexibility of the pair of engagement chains 100 may be assured. Thus, the effects of this arrangement are remarkable.

Other Embodiments

A specific mode of a pair of engagement chains of the present invention may take a variety of different embodiments without departing from the scope and meaning of the claims.

For example, the number of rows of the inner link units disposed in parallel in the chain widthwise direction of the engagement chains of the invention may be any number such as two or three rows. When a plurality of inner link units is disposed in the chain widthwise direction, outer tooth plates and inner tooth plates composing one of the pair of engagement chains engage with outer tooth plates and inner tooth plates composing the other one of the pair of engagement chains facing thereto multiply and rigidly in a manner of a hook shaped, or of a so-called chuck shaped along the plurality of rows in the chain widthwise direction. Then, it becomes possible to realize excellent chain durability by steadily suppressing buckling that is prone to be caused in the chain widthwise direction of the engagement chains and to improve an engagement balance with the driving sprockets in the chain widthwise direction.

Still more, the specific shape of the inflection restricted surface formed on the inflection restricted plate used in the engagement chain of the invention may be any shape such as a flat surface or a curved surface whose center portion is dented as long as the inflection restricted surface abuts with the inflection restricting portion formed on the inflection restricting plate when the engagement chain is stretched straightly.

Still more, the specific shape of the inflection restricting portion formed on the inflection restricting plate used in the engagement chains of the invention may be any shape as long as the inflection restricting portion is formed so as to project toward the inflection restricted plate and to abut with, while straddling, the two adjacent inflection restricted surfaces in the chain longitudinal direction.

Further, the specific shape of the inner tooth plates and outer tooth plates used in the engagement chains of the invention may have any shape as long as the engagement chains are integrated when facing each other so as to engage when brought into contact with each other and to branch when the plates are disengaged. Specifically, when buckling restricting flat surfaces formed respectively in the inner tooth plates and outer tooth plates to keep the chain engagement attitude are formed bulgingly so as to contact face-to-face while elastically deforming by mutually abutting when the inner tooth plates and the outer tooth plates are engaged and integrated, the buckling restricting flat surfaces face each other in order to steadily contact face-to-face without shaping the inner and outer tooth plates in high precision. Accordingly, it becomes possible to steadily suppress backlash of the inner tooth plates and outer tooth plates and relative dislocations along the buckling restricting flat surfaces otherwise generated between the inner tooth plates and between the outer tooth plates respectively facing to each other, to assure rigidity of the pair of engagement chains engaging with each other and to improve its buckling strength.

An engagement chain type driving system in which the pair of engagement chains of the invention is incorporated is easily lifted even if it is a stationary type in which an installation surface is a floor surface on which the system is installed or a suspension type in which the installation surface is a ceiling surface and will have no trouble in its forward and backward operation that corresponds to the lifting operation described above even if it is a cantilever supporting type in which the installation surface is a vertical wall surface.

DESCRIPTION OF REFERENCE NUMERALS 100 engagement chain
110 inner tooth plate
120 bush
130 inner link unit
140 outer tooth plate
150 connecting pin
160 roller
170 inflection restricted plate
171 inflection restricted surface
180 inflection restricting plate
181 inflection restricting portion
E engagement chain type driving system
S driving sprocket
T lift table
P base plate
M driving motor
D drive-side sprocket
C power transmission chain
G synchronizing gear group
B chain storing box

What is claimed is:

1. A pair of engagement chains, each comprising:
a plurality of inner link units each including a bush press-fitted into a pair of bush press-fitting holes formed in the chain longitudinal direction of a pair of inner tooth plates having hook portions and being disposed apart from each other in a chain width direction;
at least two outer tooth plates, each having hook portions and a pair of pin holes formed in the chain longitudinal direction, and each being disposed respectively on each outer side of the inner link unit in the chain width direction while being shifted by a half pitch in the chain longitudinal direction with respect to the inner tooth plates;
at least two inflection restricted plates, each having an inflection restricted surface on a hook engaging side of the inner tooth plates and the outer tooth plates; and
at least two inflection restricting plates, each having an inflection restricting portion that projects toward the inflection restricted surface of the inflection restricted plates so as to abut with two adjacent inflection restricted surfaces of two adjacent inflection restricted plates in the chain longitudinal direction; and
connecting pins fitted into the bushes and the pair of pin holes to link the inner link units, outer tooth plates, the inflection restricted plates, and the inflection restricting plates in the chain longitudinal direction,
wherein the pair of engagement chains are integrated by the hook portions of the inner tooth plates and the hook portions of the outer tooth plates being brought into contact so as to respectively engage with each other by a pair of driving sprockets that engage with the bushes,
wherein the pair of engagement chains are branched when the hook portions of the inner tooth plates and the hook portions of the outer tooth plates are disengaged respectively by being deflected by said pair of driving sprockets, and
wherein the inflection restricted plates are arranged in parallel with the outer tooth plates, and the inflection restriction plates are arranged in parallel with the inner tooth plates between the outer tooth plates and the inflection restricted plates.

2. The pair of engagement chains according to claim 1, wherein the inflection restricted surface of said inflection restricted plate and the inflection restricting portion of the inflection restricting plate are formed so as to abut each other in the state in which the inner tooth plates and the outer tooth plates are engaged respectively to restrict the chains from inflecting toward the hook engaging side.

3. The pair of engagement chains according to claim 2, wherein said inflection restricted plates are disposed in parallel with the outer tooth plates at the outermost end portion of the connecting pin and said inflection restricting plates are disposed between said outer tooth plates and inflection restricted plates in parallel with the inner tooth plates.

4. The pair of engagement chains according to claim 1, wherein said inflection restricted plates are disposed in parallel with the outer tooth plates at the outermost end portion of the connecting pin and said inflection restricting plates are disposed between said outer tooth plates and inflection restricted plates in parallel with the inner tooth plates.

5. A pair of engagement chains, each comprising:
at least two chain segments arranged in the chain longitudinal direction,
wherein each chain segment includes:
a plurality of inner link units each including a bush press-fitted into a pair of bush press-fitting holes formed in the chain longitudinal direction of a pair of inner tooth plates having hook portions and being disposed apart from each other in a chain width direction;
at least two outer tooth plates, each having hook portions and a pair of pin holes formed in the chain longitudinal direction, and each being disposed respectively on each outer side of the inner link unit in the chain width direction while being shifted by a half pitch in the chain longitudinal direction with respect to the inner tooth plates;
at least two inflection restricting plates, each having an inflection restricting portion, wherein the at least two inflection restricting plates are arranged on each side of the outer tooth plates in the chain width direction;
at least two inflection restricted plates, each having an inflection restricted surface on the hook engaging side of the inner tooth plates and the outer tooth plates, wherein the at least two inflection restricted plates are arranged on each side of the inflection restricting plates in the chain width direction; and
connecting pins fitted into the bushes and the pair of pin holes to link the inner link units, outer tooth plates, the inflection restricted plates, and the inflection restricting plates in the chain longitudinal direction,
wherein each of the inflection restricting portions projects toward the inflection restricted surface of the inflection restricted plates so as to abut with two adjacent inflection restricted surfaces of two adjacent inflection restricted plates of the at least two chain segments in the chain longitudinal direction, wherein the pair of engagement chains are integrated by the hook portions of the inner tooth plates and the hook portions of the outer tooth plates being brought into contact so as to respectively engage with each other by a pair of driving sprockets that engage with the bushes, wherein the pair of engagement chains are branched when the hook portions of the inner tooth plates and the hook portions of the outer tooth plates are disengaged respectively by being deflected by said pair of driving sprockets, and wherein the inflection restricted plates are arranged in parallel with the outer tooth plates, and the inflection restriction plates are arranged in parallel with the inner tooth plates between the outer tooth plates and the inflection restricted plates.

* * * * *